United States Patent [19]
Edelmann et al.
[11] Patent Number: 4,757,537
[45] Date of Patent: Jul. 12, 1988

[54] SYSTEM FOR DETECTING UNACCOUNTED FOR PRINTING IN A VALUE PRINTING SYSTEM

[75] Inventors: George B. Edelmann, Wilton; Arno Muller, Westport, both of Conn.

[73] Assignee: Pitney Bowes Inc., Stamford, Conn.

[21] Appl. No.: 724,372

[22] Filed: Apr. 17, 1985

[51] Int. Cl.[4] ............ H04L 9/00

[52] U.S. Cl. ............ 380/51; 380/23; 380/24; 380/25

[58] Field of Search ............ 178/22.01, 22.08; 364/464, 900; 340/825.34; 101/91; 380/23, 24, 25, 51

[56] References Cited

U.S. PATENT DOCUMENTS

| | | | |
|---|---|---|---|
| 3,890,599 | 6/1975 | Simjian | 340/825.34 |
| 3,990,558 | 11/1976 | Ehrat | 340/825.34 |
| 4,253,158 | 2/1981 | McFiggans | 178/22.01 |
| 4,302,821 | 11/1981 | Eckert et al. | 364/464 |
| 4,376,299 | 3/1983 | Rivest | 178/22.08 |
| 4,422,148 | 12/1983 | Soderberg et al. | 364/900 |
| 4,424,573 | 1/1984 | Eckert, Jr. et al. | 364/900 |
| 4,442,501 | 4/1984 | Eckert, Jr. et al. | 364/900 |
| 4,447,890 | 5/1984 | Duwel et al. | 364/900 |
| 4,484,307 | 11/1984 | Quatse et al. | 364/900 |
| 4,641,346 | 2/1987 | Clark et al. | 380/51 |
| 4,641,347 | 2/1987 | Clark et al. | 380/51 |

*Primary Examiner*—Salvatore Cangialosi
*Attorney, Agent, or Firm*—Donald P. Walker; David E. Pitchenik; Melvin J. Scolnick

[57] ABSTRACT

A system for detecting fraudulent imprints on documents is disclosed. The system comprises a metering device, a host and a verifying facility. The metering device provides a validation signal to the host and its associated printer. Thereafter, the printer prints information which includes information from the validation signal. Thereafter the information printed on a mailpiece can be validated at the verifying facility by detecting the validation information provided by the metering device. The system provides a method to make a secure metering device without an integral printer. This value printing system provides for a secure system that will allow for the detection of fraudulent imprints at a veryfying facility.

25 Claims, 3 Drawing Sheets

SYSTEM FOR DETECTING UNACCOUNTED FOR PRINTING IN A VALUE PRINTING SYSTEM

FIELD OF THE INVENTION

This invention relates to value printing systems and, in particular, it relates to a system wherein the metering device is completely separated from the printer when printing documents for value. For example, typically the metering device is connected to a printer in which the postage imprint contains information in the meter accounting registers.

BACKGROUND OF THE INVENTION

A postage meter typically includes a printer to imprint postal information on a mail piece. Postage meters of this type are described in a U.S. Patent issued to Alton B. Eckert, Jr., Howel A. Jones, Jr. and Frank T. Check, Jr., entitled "A Remote Postage Meter Charging System Using an Advanced Micro-Computerized Postage Meter" issued on June 27, 1978, U.S. Pat. No. 4,097,923. Another example of a meter that utilizes a printer is described in a U.S. Pat. No. 4,422,148 issued to John H. Soderberg and Alton B. Eckert, Jr. and Robert B. McFiggans entitled "Electronic Postage Meter Having Plural Computing Systems" issued on Dec. 20, 1983.

Postal meters of the above-described form may be provided with several modifications. For example, in one modification, a remote charging feature is available whereby the key is provided for operation of the three position charging switch on the keyboard. The operator of the unit may thus be provided with suitable combinations for entry into the keyboard to enable remote charging. In a further modification the three position charging switch on the keyboard may be controlled by a simple knob without the necessity of the key. In this type of system, the meter may be manually recharged at the post office, but the service function may be affected locally in a manner similar to that of the remote charging system type units.

The postage meters above described all contain printers that are an integral part of the meter itself. Although these meters as above described serve their intended purpose in an exemplary fashion it is always important to develop new and improved postage metering devices to decrease cost and improve efficiency.

As is well known, in a typical system the postage meter will contain the printing apparatus to facilitate applying postage to a mail piece or the like. The printing apparatus located within the postage meter adds to the cost and the complexity of the meter.

Typically, in an electronic postal mailing system it is important that the postal funds within the meter are secure. What is meant by the funds being secure is that when the printer prints postage indicia on a mail piece, the accounting register within the postage meter always should reflect that that printing has occurred. In typical postal mailing systems, since the meter and the printer are integral units, both are interlocked in such a manner as to ensure that the printing of a postage indicia cannot occur without accounting. Postal authorities generally require the accounting information to be stored within the postage meter and to be held there in a secure manner, thus any improved postal mailing system should include security features to prevent unauthorized and unaccounted for charges in the amounts of postal funds held in the meter. Postal authorities also require that meters be put in service and removed from service in strict compliance with their requirements for registration and periodic (say, for example, every 6 months) inspection. This enables the Post Office to keep records on the usage of a meter and detect fraud. Thus, there are also administrative costs associated with the record keeping, inspection and servicing of meters.

There is a continuing need for less expensive and more efficient postage meters. As before-mentioned, typically a postage meter has associated with it different peripherals that add to the cost thereof. It is important to develop postage meters that can be adaptable to postal mailing systems which is cheaper and more efficient, but will also be able to maintain the high level of security associated with the above-mentioned postage meters. It is also important that any new postal mailing system developed be one in which security can be maintained in a manner in keeping with the previously mentioned mailing systems. Thus, what is described is a secure postal mailing system with an improved postage meter that can be adaptable to different types of peripheral equipment.

SUMMARY OF THE INVENTION

In an illustrative embodiment, an electronic postal mailing system is disclosed which includes an electronic postage meter which comprises an accounting unit only. The accounting unit comprises of a processing unit, in this embodiment a microcomputer, a non-volatile memory (NVM) and an encryption unit connected to the microcomputer.

The accounting unit provides a capability of generating an encrypted validation number for printiing on a document. This generated validation number provides a method for detection of unaccounted printing and supplies the postal authorities with information on the meter accounting registers. The printer in this embodiment would be located within the mailing machine or some other host which would also be a part of the mailing system but separated from the accounting unit.

The host or mailing machine of this embodiment comprises principally a second microcomputer, and a printer. The meter is able to communicate with the mailing machine or host to perform all the accounting functions, to accept funds, reset to zero for removal from service and any other actions that electronic postal mailing systems generally perform. In addition, it is advantageous in this meter to use techniques such as a mechanically secure enclosure and electromagnetic shielding, isolating power supply and isolating communication links which are used to existing meters.

The electronic postage meter of this embodiment, as before-mentioned, does not print postage but supplies an electronic signal which will represent an encrypted validation number for the postage amount that it accounts for. In this embodiment the encrypted validation number is to be printed along with a dollar amount, the meter number and the date of issue. The number of typically printed in a system approved format that would be appropriate for automatic detection if required. This encrypted validation number is used to detect illegal printing of a dollar amount that has not been accounted for.

In this illustrative embodiment the mailing machine's processing unit would receive a dollar amount from a keyboard or the like and would send that information to the processing unit of the meter. The meter's encryption unit would thereafter generate an encrypted validation number using the key and plain text supplied by the processing unit of the meter. The plain text would be the postage information and meter accounting registers within microcomputers of the meter. The key would be internally stored within the NVM.

The meter would then send the validation number along with the meter serial number to the processing unit of the mailing machine or host. The processing unit within the host thereafter sends the postage information, meter serial number and validation number to a printer. The printer, in turn, imprints the postage information, date, meter serial number and validation number on a mailpiece or document. The validation number on the document would be decrypted by a unit at a postal facility which would provide the verifying information.

Verifying the validity of the imprint would be accomplished in the following manner. A third processing unit located typically within a postal facility will read the postage imprint data from the document. Thereafter the validation number on the document is decrypted and will be compared with the postal information on the document. If the information decrypted is the same as the unencrypted information on the document, then the document is to be considered a valid document. If the information decrypted is different, the document is invalid. The validation number would also include accounting unit register information to provide the connection between the printed dollar amount and the meter's accounting unit and to maintain records of the meter's usage in the postal facility. This makes it possible for the postal authorities to maintain records much more easily and accurately than is possible at the present time. It may be speculated that in a completely automated system with on-line computerized record keeping postal records could come very close to tracking the meters accounting registers.

The task of the postal authorities to guard against fraud would be made much easier, and the need for inspections would be greatly reduced.

Thus, in this illustrative embodiment a microcomputer within the meter would be in communication with a microcomputer within a mailing machine or some other type of host unit. In this system, the postage meter would supply an electronic signal which represents an encrypted validation number to the mailing machine. After receiving the appropriate signal from the postage meter, the mailing machine would signal its printer to print the desired postage amount. The post office would then be in a position to verify that the postmark imprinted by the mailing system was a legitimate one or not and maintain quite accurate records on the usage of the meter by getting a new reading of the meter accounting registers from each postmark.

Thus, in this environment, the mailing system prints the postage amount and the encrypted validation number which a post office or other agency could use to validate the postage imprint. The postage meter of this embodiment contains no printer thereby making it less complex and less expensive. In addition, a postage meter of this type could be adapted to a wide variety of mailing machines or other peripheral units. The encryption scheme utilized to protect the validity of the postage imprint can be any of a variety of schemes know to those skilled in the art including, for example, those that have been used typically to protect the accounting information located within the meter.

Therefore, this system provides for a cheaper and simpler postage meter which could be adapted to a wide variety of mailing machines. This system also allows for a postage meter which is completely separated from the printing function in which only an electrical signal is supplied to a peripheral device, i.e., a mailing machine with a printer which represents a validation number. This system also makes it much easier for the post office or other agency to detect fraud by making it possible to keep more accurate and up-to-date records on usage of each meter.

A BRIEF DESCRIPTION OF THE DRAWINGS

The above-mentioned and other features of the invention will become better understood with reference to the following detailed descriptions taken in conjunction with the accompanying drawing in which.

DETAILED DESCRIPTION

The invention is disclosed in the context of a postage meter, however, other types of meters may have the invention applied thereto with equal success and these include parcel service meters, tax stamp meters, check writing meters, ticket imprinters, and other similar devices.

Figure 1:
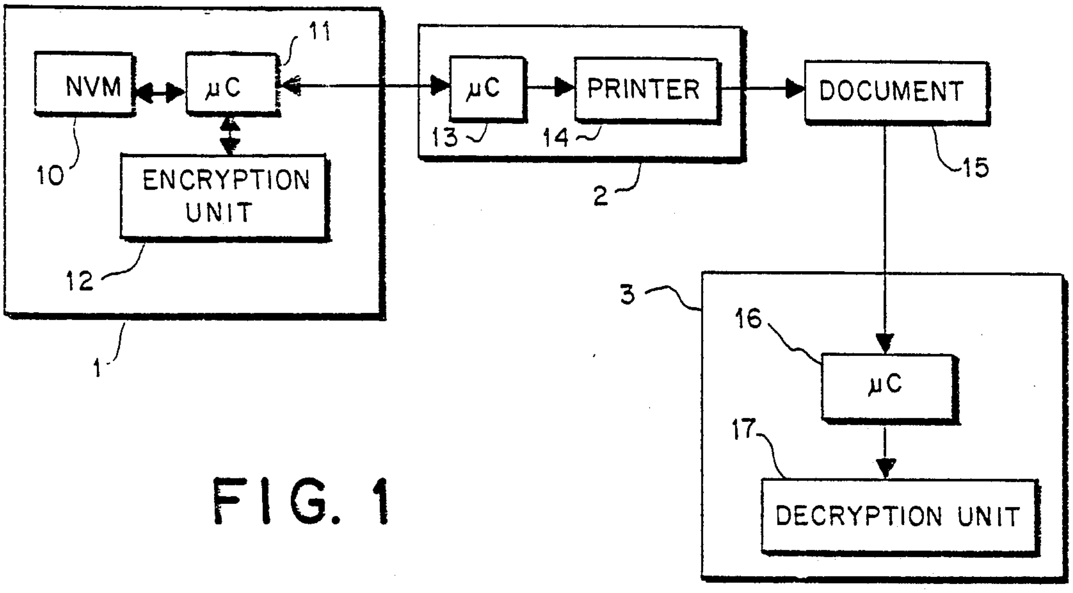
FIG. 1 is a block diagram of the electronic signal mailing system.

FIG. 1 shows in block diagram form a mailing system according to our invention. The mailing system of this invention comprises of the meter 1, which is in communication with the host 2. The host 2, typically, is a mailing machine but can also be a variety of other devices which could communicate with the meter. The host 2, in turn, imprints a postage amount along with other information on a document 15. The document 15 is then read at a verifying facility 3, that facility typically being a postal facility. At that facility 3, the decryption of the document's validation number is accomplished and the document is then validated.

The meter 1 comprises in this embodiment a processing unit or microcomputer 11 which is coupled to a non-volatile memory 10 and is also coupled to an ecryption unit 12. The meter of this embodiment does not have a printer associated therewith and provides electronic signals which represent the validation number and postage meter serial number to the host.

As can be also seen, the host 2 comprises a second processing unit or microcomputer 13 and may include a printer 14. The printer may also be a sparate unit. The microcomputer 13 provides intelligence to allow for the communication back and forth to microcomputer 11 of the meter and to the printer 14 to initiate printing when the proper information is given thereto.

Typically, a keyboard or the like (not shown) sends the information representing the postage amount to microcomputer 13. Thereafter, the microcomputer 13 sends a signal to microcomputer 11 consisting of the postage amount to obtain a validation number for printing.

The encryption unit 12 after receiving a signal from microcomputer 11 will provide the microcomputer 11 with a validation number. This validation number is typically computed with a within the encryption unit 12. The key is provided, by way of example, by combining the serial number of the postage meter and a secret constant stored in the ROM of the microcomputer 11.

The validation number will thereafter be transmitted to the microcomputer 13 of the host 2 to initiate the printing process. The printer, as before-mentioned, in turn will print on the document 15 the information communicated from the microcomputer 13. Thus, the meter provides to the host 2 the meter serial number and the validation number to be printed on document 15. The host 2, as before-mentioned provides the postage amount. In this embodiment, either the host 2 or the meter 1 can provide the city, state and date information. As will be apparent later, date information may be included in the encrypted validation number. The meter number, date and validation number on the document 15 is communicated to facility 3 where the validation number will be decrypted to enable verification of postage amount, date and accounting information.

Figure 2:
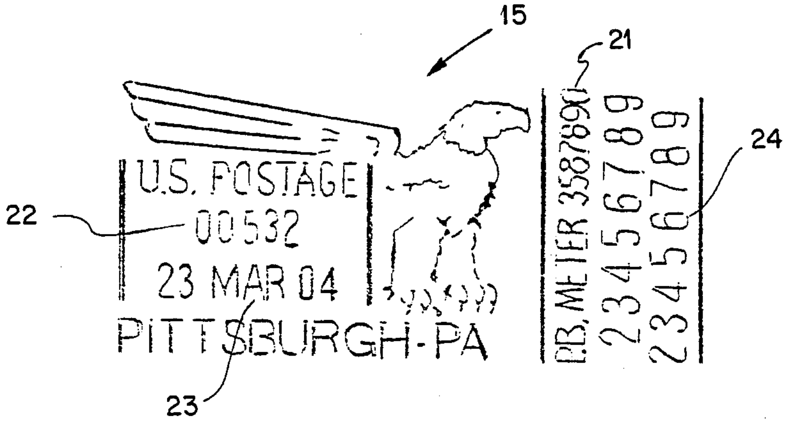
FIG. 2 is a perspective view of a document in which the printer has imprinted the postal information thereon.

Referring now to FIG. 2, the document 15 will have a dollar amount 22, the date 23 and the meter serial number 21. In addition, the document will include a validation number 24.

Figure 3:
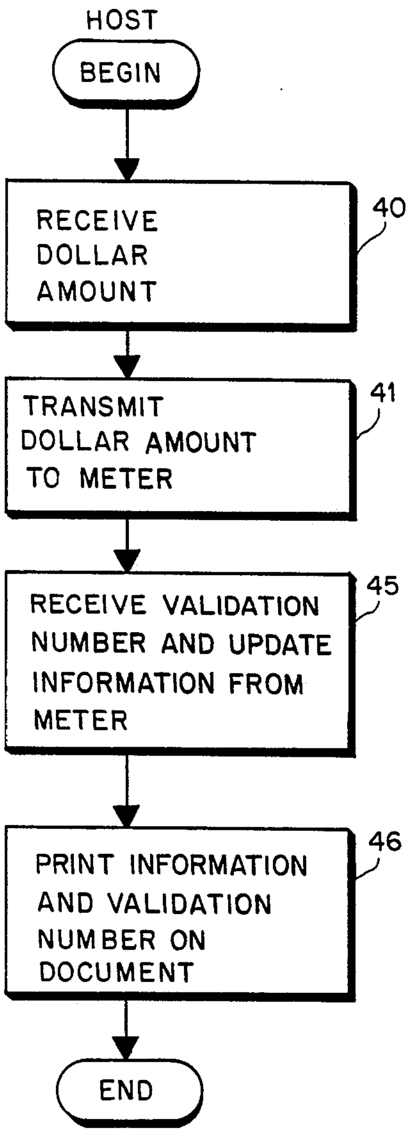
FIG. 3 is a flow chart of the operation of the host of the electronic mailing system of FIG. 1.
Figure 4:
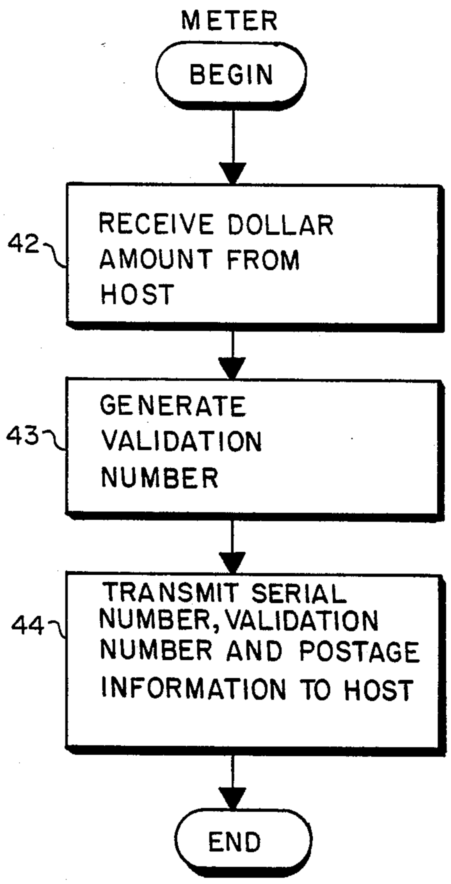
FIG. 4 is a flow chart of the operation of the meter of the mailing system of FIG. 1.
Figure 5:
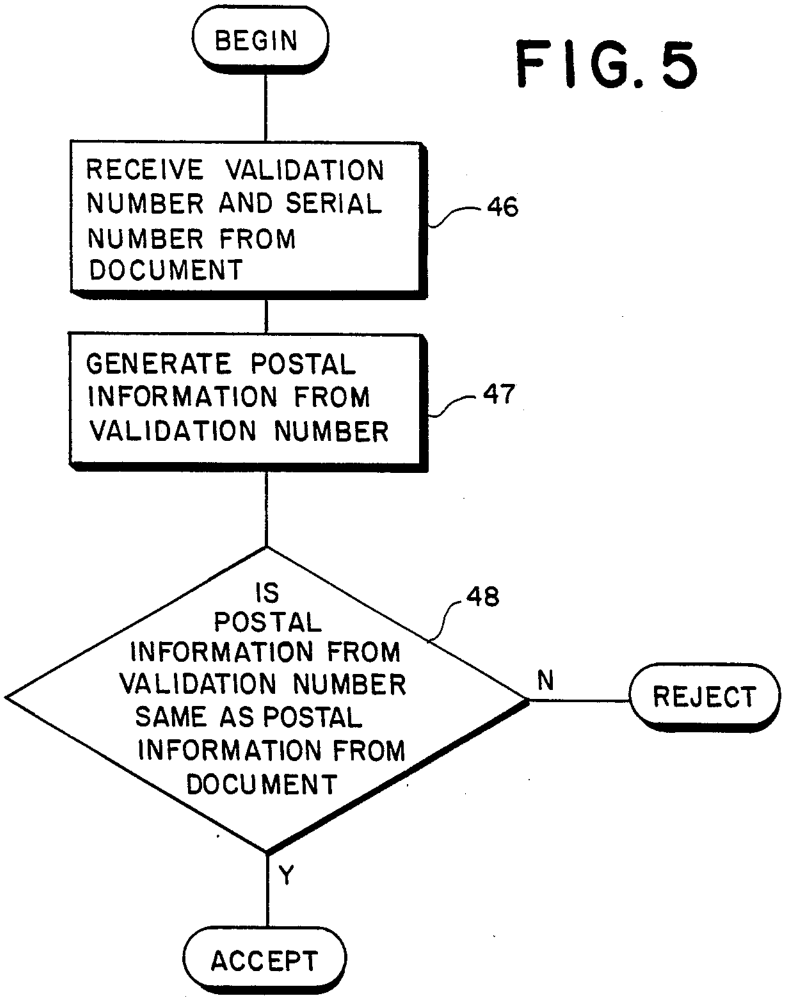
FIG. 5 is a flow chart of the operation of the verifying facility of the mailing system of FIG. 1.

FIGS. 3, 4 and 5 are flow charts describing the operation of the postal mailing system, in particular describing the method for verifying the integrity of the document. Referring to FIGS. 3 and 4, initially the host 2 (FIG. 1) will receive a dollar amount from a source, whether that be an operator or some other source, indicated by box 40. Thereafter, the dollar amount is transmitted to the meter 1 (FIG. 1), box 41. Referring to FIG. 4, the meter will then receive that dollar amount from the host 2, box 42 and will thereafter generate a validation number, box 43. After generating that validation number, the meter 1 will thereafter transmit the serial number and the validation number which includes postal information back to the host 2, box 44. Referring back to FIG. 3, the host 2 (FIG. 1) will then receive that meter serial number and validation number from the meter, box 45. Thereafter the printer 14 (FIG. 1) will print on the document the postage information, that is the dollar amount, the date, the meter serial number and the printer will also print the validation number received from the meter.

The next step in the process is to validate or to verify the integrity of that document received from that host 2. This is accomplished at the verifying facility 3 (FIG. 1). As before-mentioned the facility 3 would typically be a postal office facility and there the equipment to validate or verify postage imprint would be located. Thus, referring to FIG. 5, the microcomputer 16 (FIG. 1) would receive a validation number and meter number from the document 15, box 46 by keyboard, bar code reader or the like. Thereafter, that validation number would be decrypted and postal information would be generated, box 47 in human readable form.

The postal information that is to be generated is namely the postage amount and date received from the printer 14 of the host 2, ascending register (the total amount of postage printed by the meter), and piece counter (the total number of documents metered) information. Thereafter, that information will be compared to the postal information on the document and in the post office files. If there is a match between the information on the document and the information displayed, then the post office knows that there is a valid postage imprint. If there is not a match, then the post office knows that the imprint is invalid. (See decision box 48.) Further, if the ascending register (total amount of postage accounted for by the meter), and piece counter (total number of documents metered) information shows changes which are inconsistent with the information in the Post Office files on that meter, an inspection of the meter may be undertaken to detect malfunction or tampering.

Figure 6:
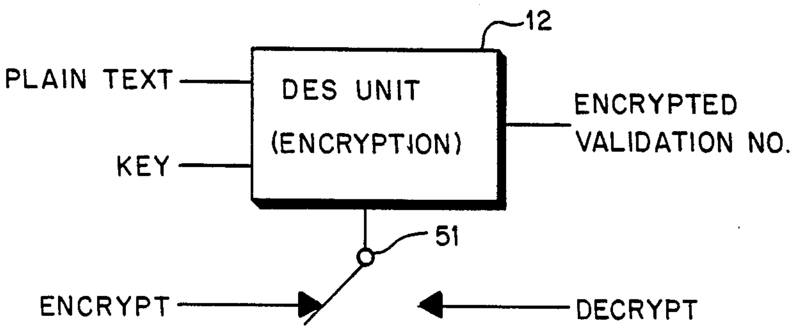
FIG. 6 is a diagram of an encryption/decryption subsystem illustrating the subsystem in the encryption mode.
Figure 7:
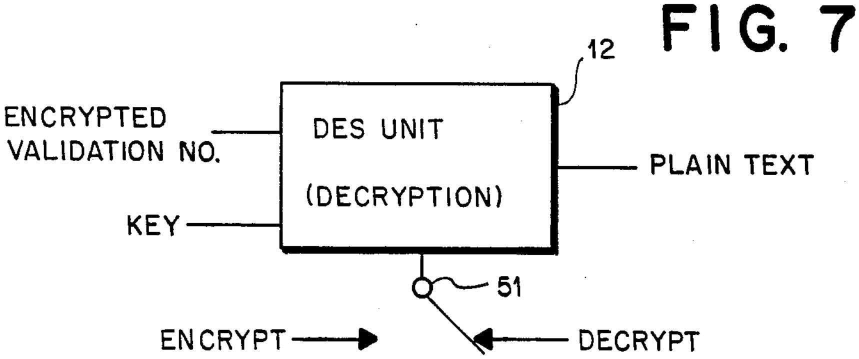
FIG. 7 is the encryption/decryption subsystem illustrating the subsystem in the decryption mode.

FIGS. 6 and 7 shows a typical encrypting/decrypting subsystem. This unit could typically conform to the Data Encryption Standard (DES) FIPS PUB 46, in which postal information, namely, the dollar amount, the date, the ascending register amount, and the piece counter content can be inputted to the unit along with a key. Encrypting data converts it to an unintelligible form called cipher. Decrypting cipher converts the data back to its original form. The algorithm described in this standard specifies both enciphering and deciphering operations which are based on a binary number called a key.

As before-mentioned, the key information is typically the serial number of the postage meter, which is printed on the document, and a secret constant. The key and postal information is thereafter combined within unit 12 to output an encrypted validation number in the encryption mode. As can be also seen in FIG. 6, switch 51 is shown moved to a position so that the postal information and the key can be entered so that the encrypted validation number is provided at the output. This type of unit can thus be utilized as the encryption unit 12 (FIG. 1) in the meter unit 1.

It is known that data can be recovered from cipher only by using exactly the same key used to encipher it. Thus, it is clear that decryption unit 17 (FIG. 7) at the postal facility is the same as the unit 12 within the meter. Referring to FIG. 7, it can be seen that the key is obtained from the combination of meter serial number on the document and a secret constant resident in the ROM (read only memory) of the microcomputer 16. The key must be the same as the key in the encryption unit 12. The switch 51 is moved from the encrypted mode to the decrypted mode to obtain decryption. At the output therefor is the postal information which includes ascending register and piece counter information. Thus, in this system if the information obtained at the postal facility is different from the information on the document then the imprint is invalid.

It should be noted that although this invention is described in terms of a particular method of decrypting and encrypting information, it is done for illustrative purposes only. Thus, this invention could be utilized with other methods of encryption/decryption and those teachings would still be within the spirit and scope of the invention. Similarly, it should be noted that although this invention is described in terms of a particular combination of information used in the generation of the validation number, it is done for illustrative purposes only. Thus this invention could be utilized with other types and combinations of information and those teachings would still be within the spirit and scope of the invention. Similarly, it should be noted that even though microcomputers were used in the meter 11, host 2 and verifying facility 3 this invention could be used with other methods of processing the information and it would still be within the spirit and scope of Applicant's invention.

Thus, the electronic mailing system of this embodiment provides a secure system. In addition, the mailing system of this embodiment provides for a postage meter which separates the printing function from the metering function. In addition, the postal authority or the like have been given additional equipment to detect fraud, that is, an unauthorized postage imprint entering the postal facility.

This system can be utilized in a variety of ways. By the use of this system, a document would be clearly fraudulent when the information contained in the decrypted validation number does not agree with the printed dollar amount, date and meter number. In addition, if two or more documents come in with the same validation number, that is also positive identification of fraud, that is a copied document. Obviously, the ascending register and piece counter information obtained from the validation number would be the same for copied documents. But by keeping records of postal information obtained from documents coming from a particular meter, it becomes very easy to spot inconsistencies in the content of ascending register and piece counters, date and estimated flow of mail through that meter. In fact, this suggests that a few of the least significant digits of the piece counter are vital in the encrypted validation number. This would make even the fraudulent creation of a validation number will full knowledge of encryption algorithm and key worthless since the ascending register and piece counter cannot be arbitrarily changed without detection of the fraud. Also, a document with a date not in agreement with the calendar date, should be considered as possible fraud, because there is a possibility that the document has been copied and altered. Finally, a fraudulent document issued at the point of sale can be detected by immediately decrypting the validation number and comparing the decrypted ascending register amount or piece counter with the meter's ascending register or piece counter. Once again, if the amounts do not compare, an invalid document has been issued.

The above described embodiment can be modified in a variety of ways and those modification would still be within the spirit and scope of Applicant's invention. For example, a telephone with a keypad in combination with a voice responsive system could be typically part of a verifying facility. In this example, a remote decryption device would be dialed up and upon answering could request, by voice, that the serial and validation numbers be keyed in on the telephone keypad. the remote facility would then decrypt the validation number and return the decrypted information to the caller via voice response. Thus, while this invention has been disclosed by a means of a specific, illustrative embodiment, the principals thereof are capable of a wide range of modification by those skilled in the art within the scope of the following claims.

What is claimed is:

1. A value printing system comprising:

a first processing means and a printing means coupled thereto, a first housing for housing the first processing means and printing means, a metering device selected from the group consisting of postage and parcel accounting service devices, a second housing for housing the metering device, the metering device including a second processing means, the first processing means comprising a source of data including a data corresponding to a value, and said first processing means including means for supplying said data to said second processing means, the metering device including non-volatile memory means coupled to said second processing means for storing accounting information therein and for transferring accounting information therefrom to the second processing means, and said metering device including means coupled to the second processing means for encrypting data supplied thereto by the first processing means, said second processing means including means responsive to data supplied thereto by said first processing means for accounting for the value to be printed by said printing system and for supplying the first processing means with encrypted data evidencing that said value has been accounted for and with additional encrypted accounting data, and said printing means including means for imprinting said encrypted value data on said additional encrypted accounting data along with said value in plain text.

2. A value printing system comprising:

a metering device for accounting for a printed plain text value, a first housing for housing the metering device, the metering device selected from the group consisting of postage and parcel service accounting devices, said metering device including a first processing means and a memory means coupled to the first processing means for storing accounting information, a host device and a second housing for housing the host device, the host device connected to supply to the metering device data corresponding to the value to be printed and to receive both encrypted data from the metering device evidencing that the value has been accounted for and additional encrypted accounting data, the host device including a second processing means and a printing means coupled to the second processing means for receiving the encrypted data from the second processing means and for printing the value in plain text and the encrypted data evidencing that value has been accounted for by the metering device and the additional encrypted accounting data.

3. The value printing system of claim 2 in which the first and second processing means are microcomputers.

4. A postal mailing system comprising:

a first housing and a postage meter housed in the first housing, the postage meter comprising a memory means for storing accounting information and key information, means for encrypting information, and a first processing means coupled to the memory means and the encrypting means for providing the accounting information and key information to the encrypting means and for receiving the encrypted information from the encrypting means; and, a second housing and a host housed in the second housing, the host comprising a second processing means connected to supply a postage amount to and to receive an encrypted postage amount from the first processing means, the first processing means supplying additional encrypted accounting information to the second processing means, and a printing means coupled to the second processing means for printing the postage amount in plain text and the encrypted additional information and encrypted postage amount.

5. The postal mailing system of claim 4 in which the first and second processing means are microcomputers.

6. The postal mailing system of claim 4 in which the encrypted information received from the second processing means is a validation number.

7. A value printing system comprising:

a metering device for accounting for value to be printed, the metering device selected from the group consisting of postage and parcel service accounting devices, a first housing for housing the metering device, the metering device including a first processing means and a memory means coupled to the first processing means for storing accounting information, the metering device including means for encrypting information, the encrypting means coupled to the first processing means, a host device for accepting encrypted accounting information from the metering device, said accounting information including an encrypted value evidencing that the value has been accounted for, a second housing for housing the host device, the host device including a second processing means responsive to the first processing means, the host device including printing means coupled to the second processing means for printing the value in plain text and the encrypted accounting information received from the first processing means, said encrypted accounting information providing an indication that the accounting information including the plain text value is valid, and means for verifying that the printed information is valid.

8. The value printing system of claim 7 in which the verifying means comprises a third processing means for decrypting the printed information.

9. The value printing system of claim 8 in which the first, second and third processing means are microcomputers.

10. A postal mailing system comprising:

a postage meter and a first housing for housing the postage meter, the postage meter including a first processing means for accounting for postage to be printed, a memory means coupled to the first processing means for storing certain accounting information, and means for providing encrypted information to the first processing means;

a host and a second housing for housing the host, the host including a second processing means coupled to supply postage value information to the first processing means and to receive encrypted accounting information including encrypted postage value information from the first processing means, and a printing means coupled to the second processing means for printing the encrypted postage value information and additional encrypted accounting information and for printing the postage value information in plain text; and a verifying facility including a third processing means for reading the printed information including the encrypted information, and means for decrypting the encrypted information, the decrypting means coupled to the third processing means, and the decrypted information being an indicator of the validity of the printed plain text information.

11. The postal mailing system of claim 10 in which the first, second and third processing means are microcomputers.

12. The postal mailing system of claim 11 in which the encrypted information received from the second processing means is a validation number.

13. A method for validating an imprint produced by a value printing system that includes a host and a first housing for housing the host, and a metering device and a second housing for housing the metering device, wherein the metering device is selected from the group consisting of parcel service device, the method comprising the steps of:

(a) receiving information at the host, (b) transmitting a value amount from the host to the metering device, (c) receiving at the metering device the value amount from the host, (d) generating at the metering device an encrypted validation number including but not limited to an encryption of the value amount in response to receiving the value amount from the host, (e) transmitting the encrypted validation number including the encrypted value amount from the metering device to the host, (f) receiving at the host the encrypted validation number including the encrypted value amount from the metering device, and (g) printing at the host the value amount in plain text and the encrypted validation number on a document.

14. The method of claim 13 in which step (d) includes the step of encrypting the information to produce a validation number.

15. The method of claim 13 in which step (d) includes the step of including accounting information in the validation number.

16. A method for verifying the validity of a postage imprint comprising the steps of (a) providing a postage meter and a first housing for housing the postage meter, and providing printing means and a second housing for housing the printing means (b) transmitting postage information from the printing means to the meter, (c) using the postage information at the meter for generating an encrypted validation number which includes but is not limited to an encryption of a postage value included in the postage information (d) receiving at the printing means the validation number generated by the meter using the postage information, (e) printing the postage information including the postage value in plain text and printing the encrypted validation number on a document, (f) reading the encrypted validation number and plain text postage information from the document, (g) generating postage information from the encrypted validation number at a verifying facility after receipt of the document, (h) comparing the generated postage information to the postage information in the plain text on the document, and (i) accepting the document if the generated postage information and the postage information in plain text on the document are the same and rejecting the document if the generated postage information is different from the postage information on the document.

17. A postal system comprising:

a postage meter and a first housing for housing the postage meter, the postage meter including a first processing means a memory means, the memory coupled to the first processing means for storing accounting information, and means coupled to the first processing means for encrypting the accounting information for the first processing means; and a mailing machine and a second housing for housing the mailing machine, the mailing machine including a second processing means for providing postage value information to the first processing means and also for receiving an encryption of the postage value and additional encrypted accounting information from the first processing means, and the mailing machine including a printing means coupled to the second processing means for printing the postage value in plain text and encrypted postage value and additional encrypted accounting information.

18. The postal mailing system of claim 16 in which the first and second processing means are microcomputers.

19. A postal system comprising:

a postage meter and a first housing for housing the postage meter, the postage meter including a first processing means for accounting for postage to be printed and providing an encrypted indication that accounting took place, a memory means coupled to the first processing means for storing accounting information, and means coupled to the first processing means for encrypting the information, the encrypted information being the encrypted indication;

a mailing machine and a second housing for housing the mailing machine, the mailing machine accepting the encrypted accounting information indicating that accounting took place, the mailing machine including a second processing means coupled to the first processing means, a printing means coupled to the seconc processing means for printing the postage in plain text and for printing the encrypted accounting information to permit verifying that the accounting information received from the first processing means provided an indication that accounting took place and that the accounting information is valid, the encrypted accounting information including an encryption of the postage and additional encrypted accounting information; and means for verifying that the accounting took place and that the printed information is valid.

20. The postal system of claim 18 in which the verifying means comprises a third processing means for decrypting the information generated by the meter.

21. The postal system of claim 19 in which the first, second and third processing means are microcomputers.

22. A method for validating a postage imprint produced by a postal mailing system having a host and a first housing for the host, and having a postage meter and a second housing for the postage meter, the method comprising the steps of:

(a) receiving postage information at the host, (b) transmitting the postage information from the host to the meter, (c) generating encrypted validation number and an encrypted postage value at the meter in response to receiving the postage information from the host, (d) transmitting the encrypted validation number and encrypted postage value information from the meter to the host, (e) receiving at the host the encrypted validation number and encrypted postage value information from the meter, and (f) printing at the host the postage value in plain text and the encrypted postage value information and the encrypted validation number on a document.

23. The method of claim 22 in which step (c) includes the step of including accounting information in the validation number.

24. The method of claim 23 in which step (c) includes the step of encryption the information to produce a validation number.

25. A postage meter system comprising first and second microcomputer systems, first and second housing for separately housing said first and second systems respectively, (a) said first microcomputer system comprising input means for receiving postage values and means for applying said postage values to said second system;

(b) said second microcomputer system comprising non-volatile memory means, means for maintaining an accounting of postage values applied thereto by said microcomputer system in said non-volatile memory, means providing encryption code signals dependent on said postage values, and means applying said encryption code signals to said first microcomputer; and said first microcomputer further comprising printing means and means responsive to a postage value received at said input means and the receipt of said encryption code signals from said second microcomputer system for printing said postage value in plain text and an encryption code corresponding to said encryption code signals, said encryption code including an encryption of the postage value and an encryption of additional postage accounting information.

* * * * *